(12) United States Patent
Kawaguchi et al.

(10) Patent No.: US 6,641,957 B1
(45) Date of Patent: Nov. 4, 2003

(54) NON-AQUEOUS ELECTROLYTE CELL

(75) Inventors: Shinichi Kawaguchi, Kishiwada (JP); Tadayoshi Takahashi, Neyagawa (JP); Nobuharu Koshiba, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 308 days.

(21) Appl. No.: 09/889,215

(22) PCT Filed: Nov. 28, 2000

(86) PCT No.: PCT/JP00/08376

§ 371 (c)(1),
(2), (4) Date: Jul. 12, 2001

(87) PCT Pub. No.: WO01/41247

PCT Pub. Date: Jun. 7, 2001

(30) Foreign Application Priority Data

| | | |
|---|---|---|
| Nov. 29, 1999 | (JP) | 11-337130 |
| Nov. 29, 1999 | (JP) | 11-337131 |
| Oct. 25, 2000 | (JP) | 2000-325310 |

(51) Int. Cl.$^7$ .................................................. H01M 6/16
(52) U.S. Cl. ..................... 429/324; 429/310; 429/311; 429/314; 429/322; 429/323; 429/231.9; 429/326; 429/338; 429/231.95
(58) Field of Search .................... 429/310, 311, 429/314, 324, 326, 338, 322, 323, 231.9, 231.95

(56) References Cited

U.S. PATENT DOCUMENTS

| 3,660,163 A | * | 5/1972 | Moser ....................... 429/323 |
| 4,310,392 A | | 1/1982 | Kohl |
| 5,888,672 A | | 3/1999 | Gustafson et al. |

FOREIGN PATENT DOCUMENTS

| JP | 09-45588 | | 2/1997 |
| JP | 10261435 | A | 9/1998 |
| JP | 2000294273 | A | 10/2000 |

* cited by examiner

*Primary Examiner*—Bruce F. Bell
(74) *Attorney, Agent, or Firm*—Akin Gump Strauss Hauer & Feld, L.L.P.

(57) ABSTRACT

The non-aqueous electrolyte battery of the present invention has a negative electrode comprising metallic lithium, a lithium alloy or a material capable of absorbing and desorbing lithium; a positive electrode; a non-aqueous electrolyte comprising a solvent and a solute dissolved in the solvent, wherein the above non-aqueous electrolyte contains at least one additive selected from phthalimide, derivative of phthalimide, phthalimidine, derivative of phthalimidine, tetrahydrophthalimide and derivative of tetrahydrophthalimide. On account of the effect of the above additive, the nonaqueous electrolyte battery of the present invention is not liable to cause an increase in the internal resistance during a long-term storage at high temperatures, and the charge/discharge cycle characteristics are improved in a secondary battery.

4 Claims, 1 Drawing Sheet

NON-AQUEOUS ELECTROLYTE CELL

TECHNICAL FIELD

The present invention relates to a non-aqueous electrolyte battery. More specifically, the present invention relates to a non-aqueous electrolyte containing an additive for suppressing an increase in the internal resistance of the battery.

BACKGROUND ART

In recent years, there has been a rapid advancement in the realization of small and lightweight electronic devices, and along with that, there has also been an increased demand for batteries having high energy densities. Accordingly, intensive researches have been made on lithium primary batteries having a negative electrode comprising metallic lithium as well as lithium ion secondary batteries having a negative electrode comprising a carbon material.

In such batteries, as a solvent for constituting the non-aqueous electrolyte, propylene carbonate, ethylene carbonate, butylene carbonate, sulfolane, γ-butyrolactone, dimethyl carbonate, diethyl carbonate, 1,2-dimethoxyethane, tetrahydrofuran, dioxolane and the like are used singly or as a mixture. Further, as a solute to be dissolved in the solvent, $LiClO_4$, $LiPF_6$, $LiBF_4$, $LiCF_3SO_3$, $LiN(CF_3SO_2)_2$, $LiN(C_2F_5SO_2)_2$ are used singly or as a mixture.

Recently, intensive researches have been made on lithium polymer batteries containing a gel non-aqueous electrolyte or a solid polymer electrolyte. The gel nonaqueous electrolyte contains a host polymer for retaining the solute and the solvent as described above. The solid polymer electrolyte is an electrolyte in which the polymer itself functions as the solvent for the solute, and a polymer similar to the host polymer contained in the gel non-aqueous electrolyte is used, for example.

As the polymers constituting these electrolytes, derivatives formed on the basis of polyvinylidene fluoride, polyethylene oxide, polyacrylonitrile, polymethyl methacrylate, polysiloxane and the like are used.

These constituting elements of the non-aqueous electrolytes are known to chemically react with moisture and the electrodes, and also with a material constituting a separator inside the battery. In particular, metallic lithium, lithium alloys such as LiAl, LiSn and the like and carbon materials capable of absorbing and desorbing lithium, which constitute the negative electrode, are highly reactive with the constituting elements of the non-aqueous electrolytes, and they form an organic coating film on the surface of the negative electrode by chemical reactions and the like. In particular, such phenomena are likely to occur when the batteries are stored in a high temperature atmosphere of 80° C. or higher, or when the charge/discharge cycle is repeated of the secondary batteries. Metal oxides often used as a positive electrode active material of the non-aqueous electrolyte batteries are known to dissolve in the non-aqueous electrolyte, and a phenomenon can be observed that materials dissolved are deposited on the surface of the negative electrode to form a coating film.

Since these films have low electrical conductivity, they constitute a cause for increasing the internal resistance of the batteries. When batteries are stored for a long time, the voltage drop at discharging due to the increase of the internal resistance of the batteries is increased, making it impossible to obtain satisfactory discharge characteristics. In secondary batteries, there is the problem that the internal resistance of the batteries is increased by repetition of the charge/discharge cycle, thereby deteriorating the cycle characteristics.

A-suggestion has been made intending to suppress the increase in the internal resistance of the batteries by adding, to the non-aqueous electrolyte, additives for forming a coating film on the surface of the negative electrode. As such additives, aromatic dicarboxylic acid esters are mentioned in Japanese Laid-Open Patent Publication No. Hei 7-22069. These additives are effective for batteries stored at room temperature; however, they have no effects on batteries stored at high temperatures or in which the charge/discharge cycle is repeated.

The present invention intends to prevent formation of an organic coating film on the surface of the negative electrode caused by chemical reactions when storing the nonaqueous electrolyte batteries at high temperatures, to suppress an increase in the internal resistance in primary batteries and secondary batteries, and to improve the charge/discharge cycle characteristics of secondary batteries.

DISCLOSURE OF INVENTION

The present invention relates to a non-aqueous electrolyte battery having a negative electrode comprising metallic lithium, a lithium alloy or a material capable of absorbing and desorbing lithium; a positive electrode; a solvent; and a solute dissolved in the solvent, wherein the above non-aqueous electrolyte contains at least one additive selected from the group consisting of compounds represented by the general formula (1):

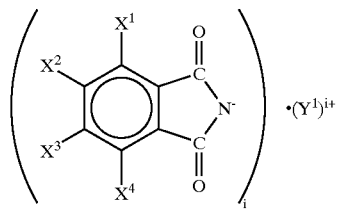

where $X^1$ to $X^4$ are independently hydrogen atoms, F, Cl, Br, I or alkyl groups having 1 to 3 carbon atoms, $Y^1$ is a hydrogen atom, Na, K, Rb, Cs, Mg, Ca, Sr or Ba, and i is 1 or 2; compounds represented by the general formula (2):

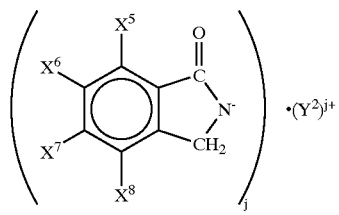

where $X^5$ to $X^8$ are independently hydrogen atoms, F, Cl, Br, I or alkyl groups having 1 to 3 carbon atoms, $Y^2$ is a hydrogen atom, Na, K, Rb, Cs, Mg, Ca, Sr or Ba, and j is 1 or 2; and compounds represented by the general formula (3):

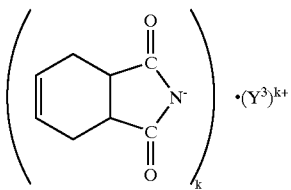

where $Y^3$ is a hydrogen atom, Na, K, Rb, Cs, Mg, Ca, Sr or Ba, and k is 1 or 2.

In the above non-aqueous electrolyte, the content of the above additive is preferably 0.001 to 10% by weight relative to the sum of the solvent and the solute.

The solute is preferably at least one selected from the group consisting of $LiPF_6$, $LiBF_4$, $LiClO_4$, $LiCF_3SO_3$, $LiAsF_6$, lithium salts represented by the general formula (4):

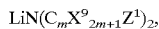
$LiN(C_mX^9{}_{2m+1}Z^1)_2$, lithium salts represented by the general formula (5):

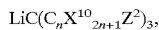
$LiC(C_nX^{10}{}_{2n+1}Z^2)_3$, and lithium salts represented by the general formula (6):

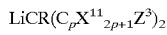
$LiCR(C_pX^{11}{}_{2p+1}Z^3)_2$ where $X^9$ to $X^{11}$ are independently F, Cl, Br or I; m, n and p are independently integers of 1 to 4; and $Z^1$ to $Z^3$ are independently CO or $SO_2$.

The aforementioned solvent preferably comprises at least one selected from the group consisting of ethylene carbonate, propylene carbonate, butylene carbonate and γ-butyrolactone.

BEST MODE FOR CARRYING OUT THE INVENTION

Figure 1:
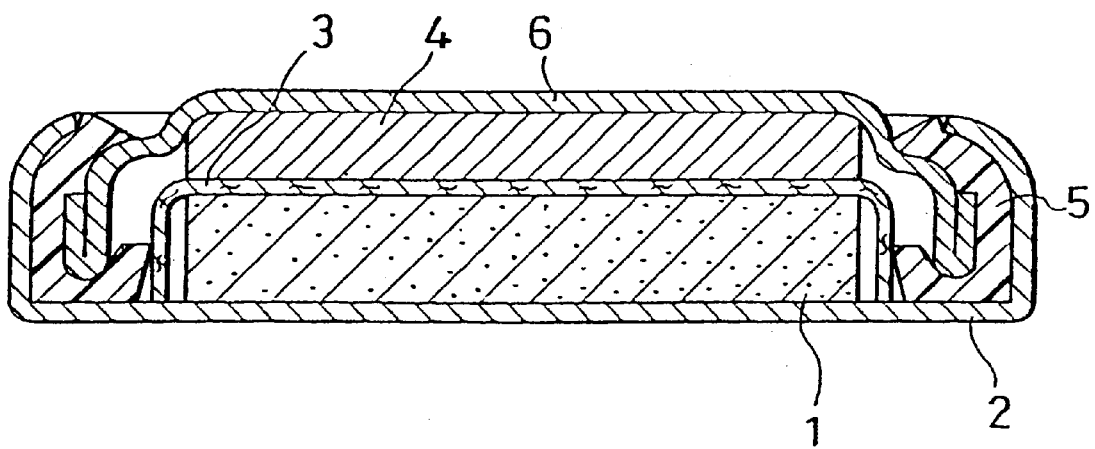
FIG. 1 is a longitudinal cross sectional view showing the structure of the non-aqueous electrolyte battery of the present invention.

The non-aqueous electrolyte contained in the nonaqueous electrolyte battery of the present invention includes a liquid non-aqueous electrolyte and gel non-aqueous electrolyte. The liquid non-aqueous electrolyte comprises an organic solvent as the solvent. The gel non-aqueous electrolyte generally comprises the above liquid non-aqueous electrolyte and a host polymer retaining thereof. The present invention is characterized in an additive to be added to these non-aqueous electrolytes.

In the non-aqueous electrolyte battery of the present invention, the non-aqueous electrolyte contains at least one additive selected from the group consisting of compounds represented by the general formula (1):

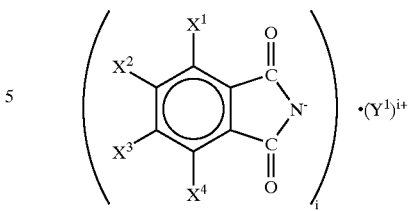

where $X^1$ to $X^4$ are independently hydrogen atoms, F, Cl, Br, I or alkyl groups having 1 to 3 carbon atoms, $Y^1$ is a hydrogen atom, Na, K, Rb, Cs, Mg, Ca, Sr or Ba, and i is 1 or 2 (phthalimide or a derivative of phthalimide); compounds represented by the general formula (2):

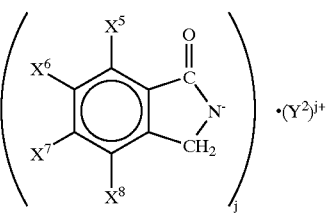

where $X^5$ to $X^8$ are independently hydrogen atoms, F, Cl, Br, I or alkyl groups having 1 to 3 carbon atoms, $Y^2$ is a hydrogen atom, Na, K, Rb, Cs, Mg, Ca, Sr or Ba, and j is 1 or 2 (phthalimidine or a derivative of phthalimidine); and compounds represented by the general formula (3):

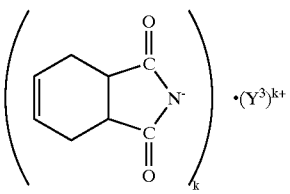

where $Y^3$ is a hydrogen atom, Na, K, Rb, Cs, Mg, Ca, Sr or Ba, and k is 1 or 2 (tetrahydrophthalimide or a derivative of tetrahydrophthalimide).

In the case where at least one selected from $X^1$ to $X^8$ is other than a hydrogen atom and the remainders are hydrogen atoms, the one other than a hydrogen atom is preferably an alkyl group or a fluorine atom.

Here, in the case where one of $X^1$ to $X^4$ is an alkyl group and the remainders are hydrogen atoms, $X^2$ or $X^3$ is preferably an alkyl group. On the other hand, one of $X^5$ to $X^8$ is an alkyl group and the remainders are hydrogen atoms, $X^6$ or $X^7$ is preferably an alkyl group and more preferably $X^6$ is an alkyl group. In any of the above, an ethyl group is particularly preferable as the alkyl group.

In the case where two of $X^1$ to $X^4$ are fluorine atoms and the remainders are hydrogen atoms, $X^2$ and $X^3$ are preferably fluorine atoms. Also, two of $X^5$ to $X^8$ are fluorine atoms and the remainders are hydrogen atoms, it is preferable that $X^6$ and $X^7$ are fluorine atoms.

In the formulae (1) to (3), in the case where $Y^1$ to $Y^3$ are divalent atoms, for example, Mg, Ca, Sr or Ba, and the above additive has two organic anions, the two organic anions may be the same or different.

The compounds represented by the general formulae (1) to (3) are considered to react with the negative electrode in preference to the organic solvent which is a constituting element of the non-aqueous electrolyte and form stable coating films having a similar structure to that of phthalimide, phthallidine or the like to suppress reaction of the organic solvent with the negative electrode. In addition, the formed coating films are considered to have a good lithium ion conductivity and hardly increase the internal resistance of the batteries as conventional additives do.

The compounds represented by the general formulae (1) to (3) include phthalimide, 2-ethylphthalimide, 2-fluorophthalimide, potassium phthalimide, potassium 2-ethylphthalimide, potassium 2-fluorophthalimide, phthalimidine, 2-ethylphthalimidine, 2-fluorophthalimidine, potassium phthalimidine, potassium 2-ethylphthalimidine, potassium 2-fluorophthalimidine, tetrahydrophthalimide, sodium tetrahydrophthalitmide, potassium tetrahydrophthalimide, magnesium tetrahydrophthalimide, calcium tetrahydrophthalimide, strontium tetrahydrophthalimide and the like.

Among these, phthalimide, 2-ethylphthalimide, 2-fluorophthalimide, phthalimidine, 2-ethylphthalimidine, 2-fluorophthalimidine, tetrahydrophthalimide and potassium tetrahydrophthalimide are the most preferable in view of the stability of the coating film formed on the surface of the negative electrode, and also because they have a low reactivity with the positive electrode, the negative electrode, and the solvent and the solute in the. non-aqueous electrolyte.

In the non-aqueous electrolyte, the amount of the additive is preferably 0.001 to 10% by weight, and more preferably 0.001 to 1% by weight relative to the sum of the solvent and the solute.

As the solute, for example $LiClO_4$, $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$ and the like can be used. They may be used singly or as a mixture of two or more of them. The concentration of the solute in the non-aqueous electrolyte is preferably in the range of 0.2 to 2.0 mol/liter.

As the organic solvents constituting the liquid nonaqueous electrolyte, it is preferable to mix an organic solvent having a high remittivity such as ethylene carbonate, propylene carbonate, butylene carbonate, γ-butyrolactone, sulfolane and vinylene carbonate with an organic solvent having a low viscosity such as dimethyl carbonate, ethyl methyl carbonate, diethyl carbonate and 1,2-dimethoxyethane. In particular, an organic solvent containing at least one selected from the group consisting of ethylene carbonate, propylene carbonate, butylene carbonate and γ-butyrolactone are preferred.

As the host polymer in the gel non-aqueous electrolyte, a derivative on the basis of polyvinylidene fluoride, polyethylene oxide, polyacrylonitrile, polymethyl methacrylate, polysiloxane and the like can be mentioned.

By combining the aforementioned non-aqueous electrolyte with the given positive electrode and negative electrode, primary batteries which are not liable to cause an increase in the internal resistance during a long-term storage of the batteries, as well as secondary batteries having excellent charge/discharge cycle characteristics at high temperatures can be obtained.

The positive electrode can be prepared by using materials which have been conventionally used in the positive electrode of non-aqueous electrolyte batteries. Usable materials for the positive electrode are, for example, metal oxides such as $LiCoO_2$, $LiNiO_2$, $LiMn_2O_4$, $LiMnO_2$, $V_2O_5$, $V_6O_{13}$, $MnO_2$, $WO_3$, $Nb_2O_5$ and $Li_{4/3}Ti_{5/3}O_4$, carbon fluoride represented by $CF_x(x \leq 1)$, sulfides such as $FeS_2$ and $TiS_2$, and conductive polymers such as polypyrrole and polyaniline.

The negative electrode can also be prepared by using materials which have conventionally been used in the negative electrode of non-aqueous electrolyte batteries. Usable materials for the negative electrode are metallic lithium, lithium alloys such as LiAl, LiSi, LiSn, LiNiSi, and LiPb, carbon materials such as graphite and coke which can absorb and desorb lithium, metal oxides such as SiO, SnO, $Fe_2O_3$, $WO_2$, $Nb2O_5$ and $Li_{4/3}Ti_{5/3}O_4$, and nitride such as $Li_{0.4}CoN$.

Next, the present invention will be described with reference to examples.

EXAMPLE 1

FIG. 1 shows a longitudinal sectional view of a coin type battery used in this example. The numeral 2 and 6 are respectively a positive electrode case and a negative electrode case each made of stainless steel, and the numeral 5 is an insulating packing made of polypropylene. The numeral 1 is a positive electrode and 4 is a negative electrode. The numeral 3 is a separator comprising a non-woven fabric made of polypropylene. This battery is 20 mm in outer diameter and 2.5 mm in height.

A positive electrode material mixture was obtained by mixing $LiCoO_2$ powder as a positive electrode active material, a carbon powder as a conductive agent and a fluorocarbon polymer as a binder in a weight ratio of 80:10:10 followed by drying the mixture. This positive electrode material mixture was molded by pressing at 2 ton/cm² into a pellet of 16 mm in diameter and 0.9 mm in thickness, and then dried at 250° C. in a dried atmosphere containing 1% or less of moisture, thereby giving a positive electrode.

On the other hand, a negative electrode material mixture was obtained by mixing a natural graphite powder as a negative electrode active material and a fluorocarbon polymer as a binder in a weight ratio of 85:15. This negative electrode material mixture was molded by pressing at 2 ton/cm² into a pellet of 16 mm in diameter and 0.9 mm in thickness, and then died at 110° C. in a dried atmosphere containing 1% or less of moisture, thereby to give a negative electrode.

Ethylene carbonate and diethyl carbonate were mixed in a volume ratio of 5:5 to give a solvent of the non-aqueous electrolyte. In this solvent, $LiPF_6$ was dissolved as a solute in a rate of 1.0 mol/liter. In the non-aqueous electrolyte obtained, an additive A1, B1, C1 or D1 as shown in Table 1; A2, D2, C2 or D2 as shown in Table 2; and A3 or B3 as shown in Table 3 were added in a rate of 0.1% by weight relative to the total weight of the solvent and $LiPF_6$.

TABLE 1

| Additive | Constitution |
| --- | --- |
| A1 | phthalimide (NH) structure |
| B1 | potassium phthalimide (NK) structure |

TABLE 1-continued

| Additive | Constitution |
|---|---|
| C1 | 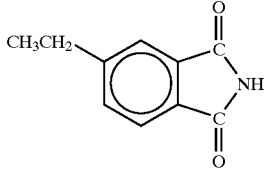 |
| D1 | 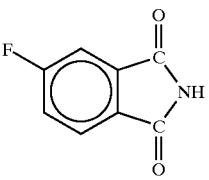 |

TABLE 2

| Additive | Constitution |
|---|---|
| A2 | 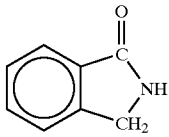 |
| B2 | 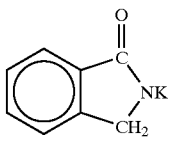 |
| C2 | 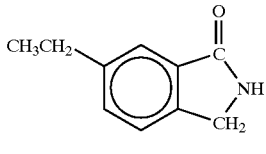 |
| D2 | 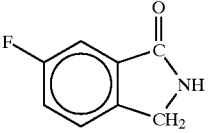 |

TABLE 3

| Additive | Constitution |
|---|---|
| A3 | 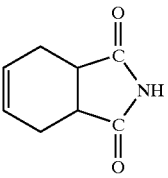 |
| B3 | 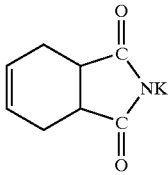 |

Using the non-aqueous electrolytes containing the obtained additives, the positive electrode and the negative electrode, coin type batteries A1, B1, C1, D1, A2, B2, C2, D2 A3 and B3 as described above were prepared. The amounts of the non-aqueous electrolytes to be poured in the batteries were 100 mg.

Also, as a comparative example, using a non-aqueous electrolyte containing no additive, similar battery 1 was prepared.

Next, with each battery, the following evaluation was made.

The batteries were charged at a constant current of 1 mA/cm² until 4.2 V, and the internal resistance of the batteries was measured. Subsequently, in the charged state, batteries A1 to D1, A2 to D2 and battery 1 were stored in a constant-temperature bath at 60° C. for two months, and batteries A3 and B3 were stored in a constant-temperature bath at 85° C. for 20 days. Then, the internal resistance of the batteries after the storage was measured. The internal resistance was measured at an alternating current of 1 kHz. The results are shown in Table 4.

TABLE 4

| | | Internal resistance of the battery (Ω) | | |
|---|---|---|---|---|
| Battery | Additive | Before storage | After storage | After charge/discharge cycle |
| Battery A1 | A1 | 12.3 | 14.1 | 14.4 |
| Battery B1 | B1 | 13.0 | 14.4 | 14.6 |
| Battery C1 | C1 | 12.2 | 12.5 | 12.7 |
| Battery D1 | D1 | 12.1 | 12.3 | 12.4 |
| Battery A2 | A2 | 12.8 | 14 2 | 14.5 |
| Battery B2 | B2 | 13.5 | 14.5 | 14.7 |
| Battery C2 | C2 | 12.7 | 12.9 | 13.3 |
| Battery D2 | D2 | 12.6 | 12.7 | 13.1 |
| Battery A3 | A3 | 12.5 | 14.2 | 14.8 |
| Battery B3 | B3 | 13.3 | 14.6 | 15.0 |
| Battery 1 | none | 11.3 | 20.4 | 21.2 |

On the other hand, the charge/discharge cycle is repeated for 100 times at a constant current of 1 mA/cm² in a voltage range of 3.0 to 4.2 V; subsequently, the internal resistance of the batteries was measured. The results are shown in Table 4.

In Table 4, all the batteries to which additives were added have a stable internal resistance compared to battery 1 containing no additive, and show smaller increase in the internal resistance caused by the storage at high temperatures and repetition of the charge/discharge cycle.

The batteries, to which an additive D1 or D2 among the above additives was added, show the best results.

EXAMPLE 2

In this example, button type batteries having the structure as shown in FIG. 1 were prepared in the following manner.

Electrolytic manganese dioxide which had been thermally treated at 400° C., a carbon powder as a conductive agent and a fluorocarbon polymer as a binder were mixed in a weight ratio of 80:10:10 to give a positive electrode material mixture. This positive electrode material mixture was molded by pressing at 2 ton/cm² into a pellet of 16 mm in diameter and dried at 250° C. in a dried atmosphere containing 1% or less of moisture, thereby to give a positive electrode.

In the negative electrode, metallic lithium was used. Specifically, a rolled lithium plate was punched into a given size and fixed on the inner side of the negative electrode case 6.

Propylene carbonate and 1,2-dimethoxyethane were mixed in a volume ratio of 5:5 to give a solvent of the non-aqueous electrolyte. In this solvent, $LiCF_3SO_3$ as a solute was dissolved in a rate of 1 mol/liter. To the non-aqueous electrolyte obtained, an additive A1, B1, C1 or D1 as shown in Table 1; an additive A2, D2, C2 or D2 as shown in Table 2; and an additive A3 or B3 as shown in Table 3 was added in a rate of 0.1% by weight relative the total weight of the above solvent and $LiCF_3SO_3$.

Using the obtained non-aqueous electrolytes, the positive electrode and the negative electrode, coin type batteries A1', B1', C1', D1', A2', B2', C2', D2', A3' and B3' as described above were prepared. The amount of the non-aqueous electrolyte to be poured into the batteries was 160 mg.

Also, as a comparative example, a similar battery 2 was prepared using a non-aqueous electrolyte containing no additive.

Next, with each battery, the following evaluation was made.

After the internal resistance of the batteries was measured, batteries A1' to D1', A2' to D2' and battery 2 were stored in a constant-temperature bath at 60° C. for two months, and batteries A3' and B3' were stored in a constant-temperature bath at 85° C. for 20 days. Then, the internal resistance after the storage of the batteries was measured. The internal resistance was measured at an alternating current of 1 kHz. The results are shown in Table 5.

TABLE 5

| Battery | Additive | Internal resistance of the battery (Ω) | |
|---|---|---|---|
| | | Before storage | After storage |
| Battery A1' | A1 | 10.1 | 11.4 |
| Battery B1' | B1 | 9.1 | 10.1 |
| Battery C1' | C1 | 8.6 | 9.2 |
| Battery D1' | D1 | 8.4 | 8.9 |
| Battery A2' | A2 | 10.6 | 11.3 |
| Battery B2' | B2 | 9.8 | 10.1 |
| Battery C2' | C2 | 9.2 | 9.5 |
| Battery D2' | D2 | 8.9 | 9.1 |
| Battery A3' | A3 | 10.5 | 13.3 |
| Battery B3' | B3 | 9.8 | 12.8 |
| Battery 2 | none | 8.2 | 15.3 |

In table 5, all the batteries to which additives were added have a stable internal resistance compared to battery 2 containing no additive and have smaller increase in the internal resistance caused by the storage at high temperatures.

EXAMPLE 3

A battery similar to battery D1' in Example 2 was prepared except that the addition rate of additive D1 was 0.0005 to 15% by weight relative to the total weight of the solvent and $LiCF_3SO_3$. Then, evaluation similar to battery D1's in Example 2 was made. The results are shown in Table 6.

TABLE 6

| Added amount of D1 | Internal resistance of the battery (Ω) | |
|---|---|---|
| (wt %) | Before storage | After storage |
| 0 | 8.2 | 15.3 |
| 0.0005 | 8.2 | 13.9 |
| 0.001 | 8.3 | 9.2 |
| 0.01 | 8.3 | 9.0 |
| 0.1 | 8.4 | 8.9 |
| 1.0 | 8.6 | 9.3 |
| 10 | 8.8 | 9.7 |
| 15 | 13.1 | 14.6 |

A battery similar to battery D2' in Example 2 was prepared except that the addition rate of additive D2 was 0.0005 to 15% by weight relative to the total weight of the $LiCF_3SO_3$. Then, evaluation similar to battery D2's In Example 2 was made. The results are shown in Table 7.

TABLE 7

| Added amount of D2 | Internal resistance of the battery (Ω) | |
|---|---|---|
| (wt %) | Before storage | After storage |
| 0 | 8.2 | 15.3 |
| 0.0005 | 8.3 | 13.2 |
| 0.001 | 8.5 | 9.3 |
| 0.01 | 8.6 | 8.9 |
| 0.1 | 8.9 | 9.1 |
| 1.0 | 9.1 | 9.3 |
| 10 | 9.5 | 9.9 |
| 15 | 13.6 | 14.9 |

A battery similar to battery A3' in Example 2 was prepared except that the addition rate of additive A3 was 0.0005 to 15% by weight relative to the total weight of the solvent and $LiCF_3SO_3$. Then, evaluation similar to battery A3's in Example 2 was made. The results are shown, in Table 8.

TABLE 8

| Added amount of A3 | Internal resistance of the battery (Ω) | |
|---|---|---|
| (wt %) | Before storage | After storage |
| 0 | 8.2 | 21.5 |
| 0.0005 | 8.5 | 19.8 |
| 0.001 | 8.9 | 15.2 |
| 0.01 | 9.6 | 13.8 |
| 0.1 | 10.5 | 13.3 |
| 1.0 | 10.8 | 13.3 |
| 10 | 12.5 | 14.5 |
| 15 | 13.8 | 17.2 |

In Tables 6 to 8, when the addition rate of the additives relative to the sum of the solvent and $LiCF_3SO_3$ is in the range of 0.001 to 10.0% by weight, an increase in the internal resistance is particularly reduced.

In the case where the addition rate of the additives relative to the sum of the solvent and $LiCF_3SO_3$ was less than 0.001% by weight, the effect for suppressing an increase in the internal resistance is not displayed so much. On the other hand, in the case where the addition rate was 10.0% by weight or more, an increase in the internal resistance due to the additive itself is observed. Also, when the addition rate is in the range of 0.01 to 1.0% by weight, best results can be obtained. In the case where similar evaluation was made using additives other than D1, D2 and A3, similar tendency was observed.

In Example 3, the effects of the present invention were explained in the case of primary batteries; however, in the case of secondary batteries, in addition to the effect for suppressing an increase in the internal resistance during storage at high temperatures, an effect for improving the charge/discharge cycle characteristics was also observed.

In each of the above examples, coin type batteries were prepared; however, the present invention is also applicable to batteries of other shapes such as cylindrical and square type batteries.

In the above examples, explanation was made about the liquid non-aqueous electrolyte; however, the present invention is also applicable to batteries using the gel non-aqueous electrolyte and the solid polymer electrolyte.

INDUSTRIAL APPLICABILITY

According to the present invention, non-aqueous electrolyte batteries which are not liable to cause an increase in the internal resistance during a long-term storage at high temperatures, and in secondary batteries, in addition to that, the charge/discharge cycle characteristics are improved.

What is claimed is:

1. A non-aqueous electrolyte battery having a negative electrode comprising metallic lithium, a lithium alloy or a material capable of absorbing and desorbing lithium; a positive electrode; and a non-aqueous electrolyte comprising a solvent and a solute dissolved in said solvent, wherein said non-aqueous electrolyte contains at least one additive selected from the group consisting of compounds represented by the general formula (1):

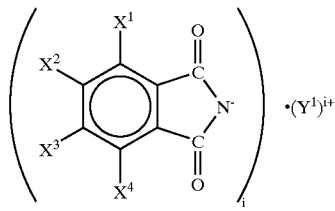

where $X^1$ to $X^4$ are independently hydrogen atoms, F, Cl, Br, I or alkyl groups having 1 to 3 carbon atoms, $Y^1$ is a hydrogen atom, Na, K, Rb, Cs, Mg, Ca, Sr or Ba, and i is 1 or 2; compounds represented by the general formula (2):

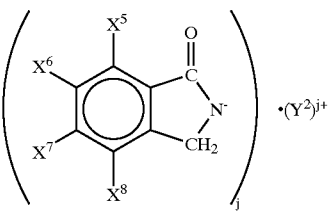

where $X^5$ to $X^8$ are independently hydrogen atoms, F, Cl, Br, I or alkyl groups having 1 to 3 carbon atoms, $Y^2$ is a hydrogen atom, Na, K, Rb, Cs, Mg, Ca, Sr or Ba, and j is 1 or 2; and compounds represented by the general formula (3):

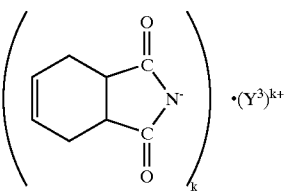

where $Y^3$ is a hydrogen atom, Na, K, Rb, Cs, Mg, Ca, Sr or Ba, and k is 1 or 2.

2. The non-aqueous electrolyte battery in accordance with claim 1, wherein the content of said additive in said non-aqueous electrolyte is 0.001 to 10% by weight relative to the sum of said solvent and said solute.

3. The non-aqueous electrolyte battery in accordance with claim 1, wherein said solute is at least one selected from the group consisting of $LiPF_6$, $LiBF_4$, $LiClO_4$, $LiCF_3SO_3$, $LiAsF_6$, lithium salts represented by the general formula (4):

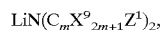

$LiN(C_mX^9{}_{2m+1}Z^1)_2$, lithium salts represented by the general formula (5): and

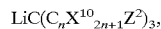

$LiC(C_nX^{10}{}_{2n+1}Z^2)_3$, lithium salts represented by the general formula (6):

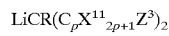

$LiCR(C_pX^{11}{}_{2p+1}Z^3)_2$ where $X^9$ to $X^{11}$ are independently F, Cl, Br or I; m, n and p are independently integers of 1 to 4; and $Z^1$ to $Z^3$ are independently CO or $SO_2$.

4. The non-aqueous electrolyte battery in accordance with claim 1, wherein said solvent comprises at least one selected from the group consisting of ethylene carbonate, propylene carbonate, butylene carbonate and γ-butyrolactone.

* * * * *